May 20, 1952　　　W. E. WITHALL　　　2,597,768
FRICTION SHOCK ABSORBER FOR RAILWAY CAR TRUCKS
Filed Oct. 20, 1949　　　2 SHEETS—SHEET 2

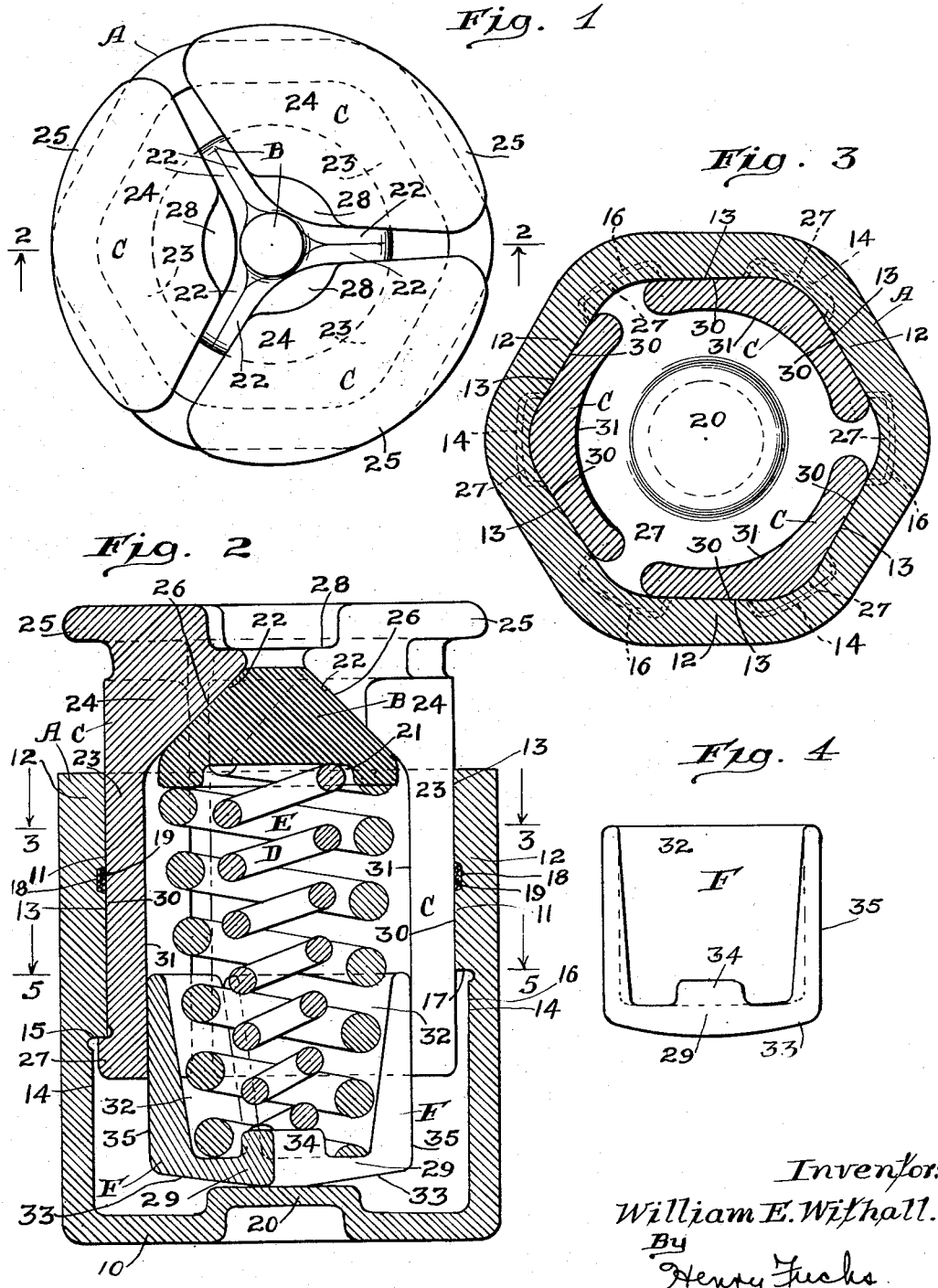

Inventor:
William E. Withall.
By Henry Fuchs.
Atty.

Patented May 20, 1952

2,597,768

UNITED STATES PATENT OFFICE 2,597,768

FRICTION SHOCK ABSORBER FOR RAILWAY CAR TRUCKS

William E. Withall, Hinsdale, Ill., assignor to W. H. Miner, Inc., Chicago, Ill., a corporation of Delaware Application October 20, 1949, Serial No. 122,500

5 Claims. (Cl. 267—9)

1

This invention relates to improvements in friction shock absorbers for use in connection with railway car truck springs for snubbing or dampening the action of said springs.

One object of the invention is to provide a friction shock absorber, of the character indicated, comprising a friction casing, three elongated friction shoes slidingly telescoped within the casing, a combined wedge and spring follower in wedging engagement with the shoes at the outer ends thereof, and spring means yieldingly opposing movement of the combined wedge and spring follower and the shoes inwardly of the casing, wherein outwardly rocking elements are arranged to cooperate with the inner ends of the shoes to press the latter outwardly against the interior of the casing, and wherein these rocking elements are actuated by the spring means which opposes inward movement of the combined wedge and spring follower.

Other objects of the invention will more clearly appear from the description and claims hereinafter following.

Figure 5:
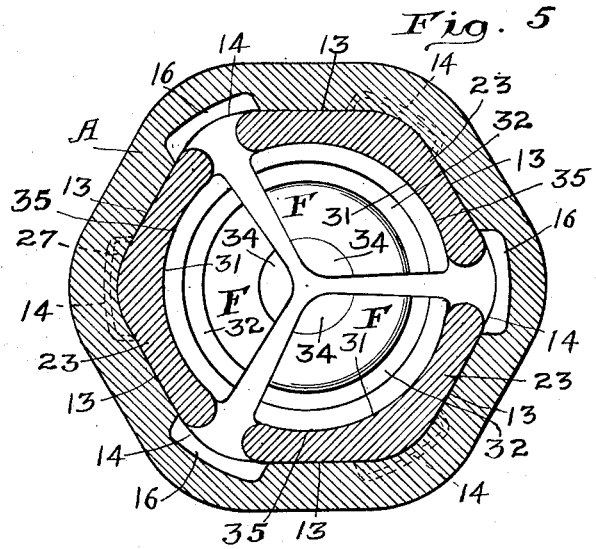
Figure 6:
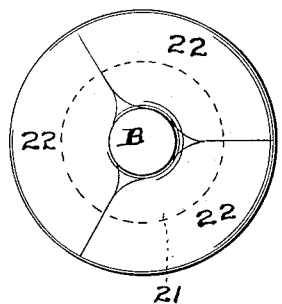
Figure 7:
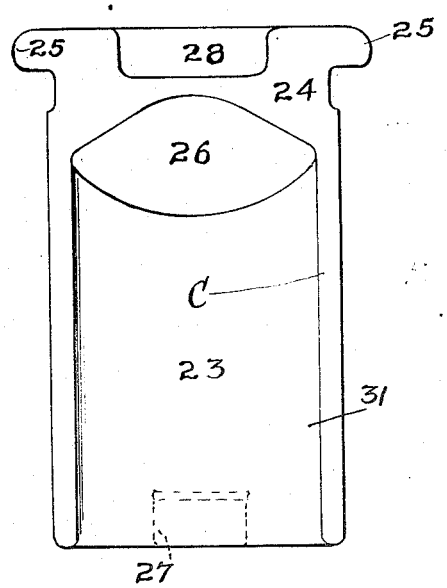
Figure 8:
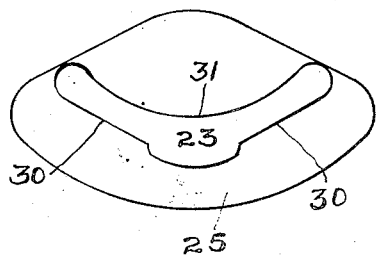

In the accompanying drawings forming a part of this specification, Figure 1 is a top plan view of the improved shock absorber. Figure 2 is a transverse, vertical sectional view, corresponding substantially to the line 2—2 of Figure 1. Figure 3 is a horizontal sectional view, corresponding substantially to the line 3—3 of Figure 2. Figure 4 is an inside, elevational view of one of the rockers shown in Figure 2. Figure 5 is a horizontal sectional view, corresponding substantially to the line 5—5 of Figure 2. Figure 6 is a top plan view of the combined wedge and spring follower of my improved mechanism. Figure 7 is an inside elevational view of one of the friction shoes of my improved mechanism. Figure 8 is a plan view of the friction shoe shown in Figure 7, looking upwardly in said figure.

Referring to the drawings, my improved friction shock absorber comprises broadly a friction casing A, a combined wedge and spring follower B, three friction shoes C—C—C, springs D and E, and rockers F—F—F.

The casing A is in the form of a tubular member of hexagonal, horizontal, transverse cross section, open at its top end, and having a transverse wall 10 at its bottom end. The six side walls of the hexagonal casing A are indicated, respectively, by 11—11—11—11—11—11.

At the top end portion of the casing, the side walls are inwardly thickened to provide a friction shell section 12, presenting interior friction faces 13—13—13—13—13—13, adjacent faces 13—13

2 together forming friction surfaces of V-shaped, transverse cross section. As shown in Figure 2, the friction faces 13 extend lengthwise of the mechanism, parallel to the central, longitudinal axis of the casing. At three alternate corners of the shell section 12, the casing is provided with relatively short, vertical guide slots 14—14—14, which extend upwardly from the lower ends of the friction faces of the shell section. The transverse upper end wall of each of these slots provides a transverse stop shoulder 15 for a purpose hereinafter described.

At the remaining three alternate corners of the shell section 12, additional vertically extending guide slots 16—16—16 are provided, which extend upwardly from the lower ends of the friction faces of the shell section, and terminate above the upper ends of the slots 14—14—14. The transverse upper end wall of each slot 16 provides a transverse stop shoulder 17, which is at a level above the shoulders 15—15—15. In other words, the stop shoulders 15 and 17 are staggered with respect to each other. This staggered arrangement of stop shoulders is illustrated more in detail and claimed in my co-pending application, Serial No. 110,406, filed August 15, 1949, now Patent No. 2,558,117, issued June 26, 1951. The interior of the friction shell section 12, at a point below the upper end thereof, is preferably provided with an inwardly opening, horizontal groove 18 filled with lead 19, or a similar material, for lubricating the engaging friction surfaces of the shoes and casing. The bottom wall 10 of the casing is upwardly offset at the center to provide a hollow boss 20, adapted to accommodate the usual spring centering projection of the bottom spring follower plate of the spring cluster of a railway car truck.

The combined wedge and spring follower B is in the form of a block having a central seat 21 in its bottom face, as clearly shown in Figure 2. The upper end portion of the block B is provided with three upwardly converging, flat wedge faces 22—22—22. The wedge faces 22—22—22 are arranged symmetrically about the longitudinal central axis of the casing and have wedging engagement with the three shoes C—C—C.

The friction shoes C, which are three in number, are interposed between the combined wedge and spring follower B and the V-shaped, interior friction surfaces of the casing, each of which is formed by two adjacent friction faces 13—13 of the shell section 12. Each shoe C comprises a relatively heavy, platelike section 23 of V-shaped, transverse cross section, and an inward enlargement or head 24 at the upper end of the section 23. At the upper end thereof, the head portion 24 presents a laterally outwardly projecting flange 25 adapted to overhang the end of the casing A. The V-shaped plate section of the shoe presents two longitudinally extending, laterally inwardly converging friction faces 30—30 on its outer side, which together form a friction surface of V-shaped, transverse cross section. The friction faces 30—30 of each shoe are engaged with two adjacent friction faces 13—13 of the casing A. On the inner side the plate section 23 of each shoe presents a lengthwise extending, transversely curved friction surface 31 with which one of the rockers F is engaged. The inner side of the head 24 of each shoe presents a flat wedge face 26, engaged with, and correspondingly inclined to, one of the wedge faces 22 of the combined wedge and spring follower B. At the bottom end, each shoe C has a laterally outwardly projecting, central stop lug 27 for limiting outward movement of the shoe with respect to the casing as hereinafter pointed out. As shown in Figure 2, the shoes are arranged within the casing so that the lugs 27—27—27 of the three shoes are engaged within the slots 14—14—14 of the casing and are engageable with the shoulders 15—15—15 to limit outward movement of the shoes.

The shoes C—C—C are also recessed on their inner sides at the upper ends, as indicated at 28—28—28, to provide a seat for the usual spring centering lug of the top spring follower plate of the cluster of truck springs.

The rockers F are three in number and are arranged symmetrically about the axis of the mechanism and are supported on the boss 20 of the bottom wall 10 of the casing A. Each rocker F comprises a substantially horizontal base portion 29 and a transversely curved, upstanding wall section 32 at the outer side of the base. The base portion 29 presents a convexly curved bottom face 33, which rests on the boss 20, and the upstanding wall section 32 presents a lengthwise extending, transversely curved friction surface 35 on its outer side engaged with the transversely curved inner surface 31 of the corresponding shoe. At the upper side at the inner end thereof, the horizontal base portion of each rocker is provided with an upstanding projection 34 engageable within the outer spring E, the lugs 34—34—34 together forming centering means for said spring.

The inner spring D is in the form of a helical coil, tapered toward its bottom end, as shown in Figure 2. The spring D has its upper end engaged in the seat 21 of the combined wedge and spring follower B and its lower end resting on the projections 34—34—34 of the rockers F—F—F.

The spring E surrounds the spring D and is also in the form of a helical coil tapered toward its bottom end. The spring E is heavier than the spring D and has its top and bottom ends bearing, respectively, on the bottom side of the combined wedge and spring follower B and the upper sides of the bases 29—29—29 of the rockers F—F—F, with the projections 34—34—34 of said rockers engaged within the lower end of said spring. The springs D and E are under initial compression, in the assembled condition of the mechanism, thus pressing the combined wedge and spring follower upwardly against the wedge faces of the shoes to spread the same apart at their upper end portions, and rocking the rockers F—F—F outwardly against the bottom end portions of the shoes to spread the latter at their lower ends.

My improved shock absorber preferably replaces one or more of the units of the truck spring cluster of a railway car, being interposed between the top and bottom spring plates of said cluster.

The operation of my improved shock absorber is as follows: Upon the spring cluster of the truck of a railway car being compressed between the spring follower plates of the cluster, the shoes are forced downwardly with respect to the casing A, against the resistance of the combined wedge and spring follower B. The shoes are thus spread apart by the combined wedge and spring follower B and the rockers F—F—F, into tight frictional engagement with the friction surfaces of the casing. During inward movement of the shoes on the friction surfaces of the casing A and rockers F—F—F, high frictional resistance is produced to snub the action of the truck springs. Upon recoil of the truck springs and upward movement of the top spring plate of the truck spring cluster, the expansive actions of the springs D and E return all of the parts to their normal positions, outward movement of the shoes being limited by engagement of the lugs thereof with the stop shoulders of the casing. As will be evident, the rockers F—F—F, at the bottom of the casing A, serve to prevent inward tilting of the lower ends of the shoes which might otherwise occur if the combined wedge and spring follower alone were relied upon to spread the shoes apart.

I claim:

1. In a friction shock absorber, the combination with a friction casing open at one end and closed at the other end by a transverse wall, said casing having interior friction surfaces; of a plurality of elongated friction shoes slidingly telescoped within the casing in engagement with the friction surfaces thereof, each of said shoes having a wedge face at its outer end; a combined wedge and spring follower engaging the wedge faces of said shoes; a plurality of rockers supported on the transverse wall of the casing and bearing on the inner sides of the shoes at the lower end portions thereof to spread said lower end portions of the shoes apart; and spring means within the casing interposed and reacting between said combined wedge and spring follower and said rockers.

2. In a friction shock absorber, the combination with a friction casing open at one end and closed at the other end by a transverse wall, said casing having interior friction surfaces; of a plurality of elongated friction shoes slidingly telescoped within the casing in engagement with the friction surfaces thereof, each of said shoes having a wedge face at its outer end; a combined wedge and spring follower engaging the wedge faces of said shoes; a plurality of rockers having horizontal base portions and upstanding sections on said base portions, said base portions being in rocking engagement with said transverse wall of the casing, and said upstanding sections bearing on the sides of said shoes at the lower ends thereof to spread said lower end portions of the shoes apart; and spring means within the casing interposed and reacting between said combined wedge and spring follower and said rockers.

3. In a friction shock absorber, the combination with a friction casing open at one end and closed at the other end by a transverse wall; of a plurality of elongated friction shoes slidingly telescoped within the casing in contact with the interior thereof, each of said shoes having a wedge face on its inner side at the outer end portion thereof; a wedge block engaging the wedge faces of the shoes; rockers within the casing engaging the inner sides of said shoes at the lower ends thereof, each rocker having a convex underneath surface in engagement with said transverse wall of the casing; and springs within the casing interposed between and bearing at opposite ends on said wedge block and rockers, respectively.

4. In a friction shock absorber, the combination with a friction casing open at one end and closed at the other end by a transverse wall; of a plurality of friction shoes slidingly telescoped within said open end of the casing in contact with the interior thereof; an inturned flange at the outer end of said shoe; a wedge face on the inner side of said flange; a plurality of rockers having base portions supported for outward rocking movement on said transverse wall of the casing, each rocker having a section angularly disposed with respect to said base portion and engaged with the inner side of one of said shoes at the lower end of the latter; a wedge in wedging engagement with the wedge faces of said shoes; and springs interposed between and bearing at opposite ends on the base portions of said rockers and said wedge.

5. In a friction shock absorber, the combination with a friction casing open at its upper end and having a transverse bottom wall; of a plurality of elongated friction shoes arranged symmetrically about the central longitudinal axis of the mechanism in sliding engagement with the interior of the casing, said shoes having downwardly facing wedge faces on their inner sides at the upper end portions of said shoes; a wedge block in wedging engagement with said wedge faces; a plurality of rockers at the bottom ends of said casing, each rocker having a horizontal base portion rockingly supported on said bottom wall of the casing, each rocker having an upstanding section at the outer end thereof contacting the inner side of the corresponding shoe at the lower end portion of the latter; and coil springs interposed and reacting between said wedge block and the base portions of said rockers.

WILLIAM E. WITHALL.

REFERENCES CITED

The following references are of record in the file of this patent:

UNITED STATES PATENTS

| Number | Name | Date |
|---|---|---|
| 756,919 | Washburn | Apr. 12, 1904 |
| 787,416 | Washburn | Apr. 18, 1905 |
| 1,320,563 | Moore | Nov. 4, 1919 |